United States Patent [19]

Yeung et al.

[11] Patent Number: 4,835,435
[45] Date of Patent: May 30, 1989

[54] SIMPLE, SENSITIVE, FREQUENCY-TUNED DROP DETECTOR

[75] Inventors: King W. W. Yeung, Fremont, Calif.; Douglas L. Franz, Vancouver, Wash.

[73] Assignee: Hewlett-Packard Company, Palo Alto, Calif.

[21] Appl. No.: 145,425

[22] Filed: Jan. 19, 1988

[51] Int. Cl.$^4$ .............................................. H01L 41/08
[52] U.S. Cl. .................................... 310/324; 310/323; 310/328; 310/800; 346/75; 346/140 R
[58] Field of Search ............... 310/328, 321, 323, 324, 310/800; 346/75, 140 R

[56] References Cited

U.S. PATENT DOCUMENTS

| | | | |
|---|---|---|---|
| 3,365,593 | 1/1968 | Roof et al. | 310/324 X |
| 3,816,773 | 6/1974 | Baldwin et al. | 310/321 X |
| 4,067,019 | 1/1978 | Martin et al. | 310/328 X |
| 4,114,063 | 9/1978 | Nelkin | 310/321 X |
| 4,128,841 | 12/1978 | Brown et al. | 346/75 |
| 4,286,274 | 8/1981 | Shell et al. | 346/75 |
| 4,493,993 | 1/1985 | Kanamuller et al. | 346/75 X |
| 4,527,105 | 7/1985 | Shiraishi | 310/324 |
| 4,542,325 | 9/1985 | Kobayashi et al. | 310/324 |
| 4,603,316 | 7/1986 | Kobayashi et al. | 310/324 X |
| 4,626,729 | 12/1986 | Lewiner et al. | 310/324 |
| 4,734,611 | 3/1988 | Granz | 310/324 |

Primary Examiner—Mark O. Budd
Attorney, Agent, or Firm—William H. F. Howard; Saundra S. Hand

[57] ABSTRACT

A drop detector having a piezoelectric membrane mounted to a substrate is presented. When a drop strikes the piezoelectric membrane, the membrane vibrates at a selected resonant frequency. The resonant frequency is selected to enhance the sensitivity of the drop detector and the signal-to-noise ratio of the output. The value of the selected resonant frequency depends on the type of material used for the piezoelectric membrane, the thickness of the membrane, the mounting of the membrane to the substrate, and other parameters such as the coating on the membrane. The vibrations of the membrane produce an output signal having a frequency equal to the selected resonant frequency. Since the frequency of the output signal is known, the output signal can be filtered with a bandpass filter to enhance the signal-to-noise ratio of the output signal. The resulting membrane drop detector is a high sensitivity, high signal-to-noise ratio drop detector.

12 Claims, 5 Drawing Sheets

SIMPLE, SENSITIVE, FREQUENCY-TUNED DROP DETECTOR

FIELD OF THE INVENTION

The invention relates to the field of drop detectors. In particular, the invention relates to the field of high sensitivity drop detectors.

BACKGROUND OF THE INVENTION

Drop detectors have various applications. U.S. Pat. No. 4,583,975, *Indirect Piezoelectric Drop Counter and Method*, discloses a drop detector used in medical applications. U.S. Pat. No. 4,401,909, *Grain Sensor Using A Piezoelectric Element*, discloses a drop detector for detecting grain particles dropping and impacting a tractor's sounding board. Ink jet printers may use drop detectors to measure the presence and speed of ink drops.

The prior-art drop detectors identify drops using various approaches. One prior-art electrostatic drop detector charges a drop when the drop forms. Later, an electric-field-sensing device senses the electric field of the charged drop and produces an output signal in response to the detection of that drop. Another prior-art electrostatic drop detector detects charged drops with an electrode. When a charged drop impacts the electrode, the charge on the drop produces a small current in the electrode that indicates the presence of a drop. Unfortunately, electrostatic drop detectors have low sensitivity which makes them useless in many applications. Another prior-art drop detector directs a collimated beam of light at a photodetector. When the drops travel through the light beam, the photodetector output varies accordingly to indicate the detection of a drop. However, the collimated beam of light must be precisely aligned with the photodetector and the drop trajectory. This precise alignment is difficult and expensive to obtain and makes optical drop detectors unsuitable for many applications.

Other prior-art drop detectors are disclosed in the following patents. U.S. Pat. No. 4,583,975, *Indirect Piezoelectric Drop Counter and Method*, mentioned in a previous paragraph, mounts a polymeric piezoelectric film on the wall of the chamber. Instead of striking the piezoelectric film directly, the drops strike the surface of accumulated fluid and pressure waves travel through the walls of the chamber to the piezoelectric film. U.S. Pat. No. 4,401,909, *Grain Sensor Using A Piezoelectric Element*, mentioned in a previous paragraph, mounts a piezoelectric transducer on a sounding board. When grain strikes the sounding board, the piezoelectric transducer is stressed and produces an output signal. U.S. Pat. No. 4,128,841, *Droplet Microphone*, discloses a piezoelectric transducer mounted behind flexible diaphragm placed in the path of the moving droplet. U.S. Pat. No. 4,286,274, *Ink Droplet Catcher Assembly*, discloses a modified version of the device disclosed in the U.S. Pat. No. 4,128,841. This modified version does not have the diaphragm and exposes the piezoelectric transducer directly to the ink drops. U.S. Pat. No. 4,067,019, *Impact Position Transducer For Ink Jet*, discloses a relatively inflexible, piezoelectric substrate attached to two parallel, closely-spaced conductors placed in the path of a moving droplet. These prior-art drop detectors have low sensitivity that impairs their ability to detect small drops. Additionally, these prior-art drop detectors do not work reliably in environments with electrical, acoustical, or mechanical noise because their output has a low signal-to-noise ratio. Many applications need drop detectors that can detect small drops and drops traveling in rapid succession of one another. Other applications require drop detectors that can detect drops in an electrically or acoustically noisy environment. None of these prior-art drop detectors appears to perform well in such environments or applications.

SUMMARY OF THE INVENTION

The present invention is a drop detector that, when struck by a drop, produces an output signal with a selected resonant frequency, shown in FIG. 5B. Since this output signal has a selected resonant frequency, it is readily distinguishable in a noisy environment and a filter can be constructed that eliminates the noise. In contrast, when prior-art drop detectors are struck by a drop, they produce an output signal with a change in voltage amplitude as shown in FIG. 5A. In noisy environments, this signal is often indistinguishable from the noise and the prior-art drop detector is useless.

A drop detector producing an output signal having a selected resonant frequency can be constructed by mounting a piezoelectric membrane to a substrate. The selected resonant frequency depends on the type of material used for the piezoelectric membrane, the thickness of the membrane, the mounting of the membrane to the substrate, and other parameters such as the coating on the membrane. When a drop strikes the piezoelectric membrane, the membrane vibrates at the selected resonant frequency. The vibrations of the membrane produce an output signal having a frequency equal to the selected resonant frequency. Since the frequency of the output signal is known, the output signal can be filtered with a bandpass filter to enhance the signal-to-noise ratio of the output signal. The resulting membrane drop detector is a high sensitivity, high signal-to-noise ratio drop detector that is capable of applications beyond drop detectors in the prior art.

Since the resonant frequency of the drop detector is selected, the drop detector of the present invention has the advantage that the resonant frequency can be selected to optimize the sensitivity and signal-to-noise ratio of the detector in a particular environment. Optimization of the sensitivity and the signal-to-noise ratio is achieved by selecting a resonant frequency where the composite environment produces little acoustic and electrical ambient noise. An additional advantage of the present invention is that the output signal frequency is known. Thus, the output signal of the drop detector can be filtered with a bandpass filter to improve the signal-to-noise ratio of the detector. By placing the piezoelectric membrane in the drop trajectory, the drop detector of the present invention has the advantage of directly detecting a drop without interference from any intermediate part. An additional advantage of the membrane drop detector is its ability to detect small drops traveling at low velocities, such as, a 100 nanogram drop having a velocity component normal to membrane in the range of 1-100 m/sec. A further advantage of the membrane drop detector is the use of inexpensive parts and a simple manufacturing procedure. The high sensitivity and high signal-to-noise ratio drop detector of the present invention creates new applications for drop detectors. Some of these new applications are detecting small drops ejected by ink jet printers, metering out small quantities of pharmaceuticals and chemicals, and conducting measurements for chemical analysis.

DETAILED DESCRIPTION OF THE PREFERRED EMBODIMENT OF THE INVENTION

The following description has assigned reference numbers to the components. Each component has a two part number. The number preceding the hyphen represents the figure number. The number following the hyphen refers to the component.

Figure 1:
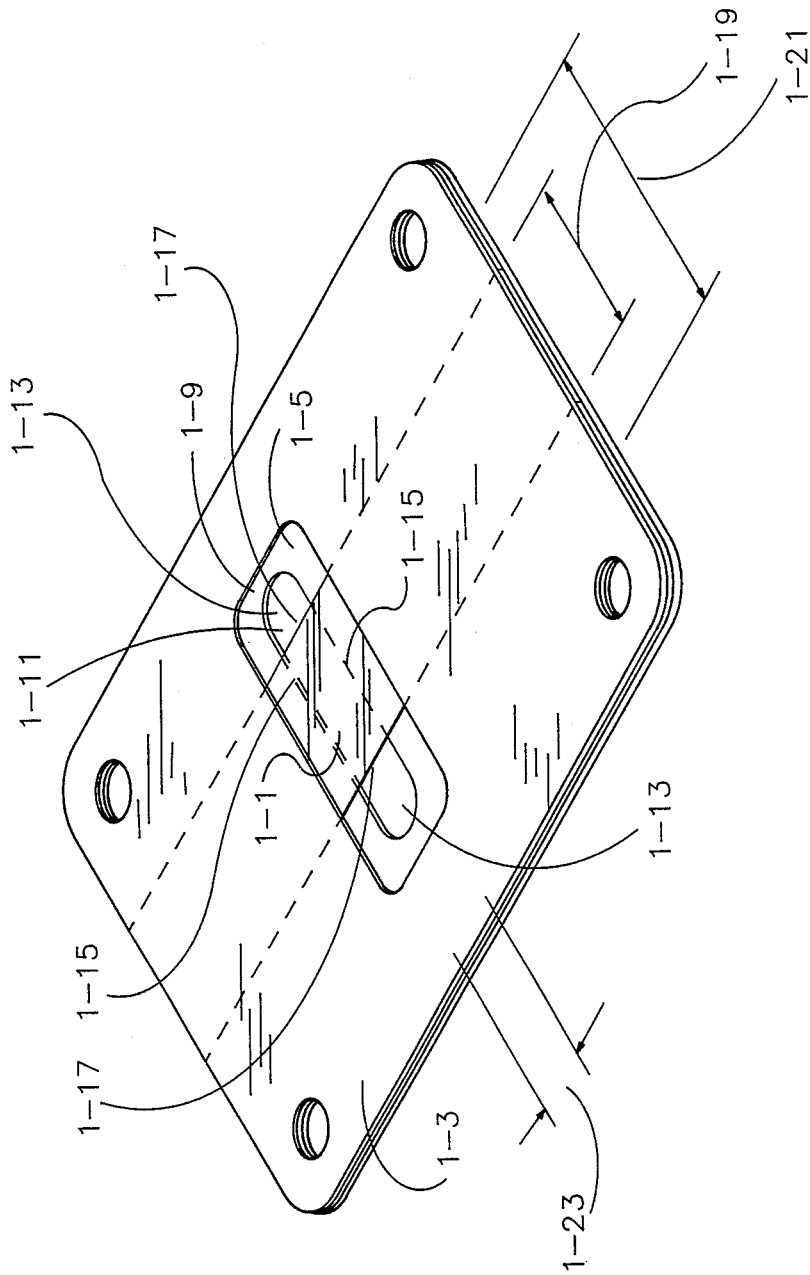
FIG. 1 shows the preferred embodiment of the membrane drop detector.
Figure 2:
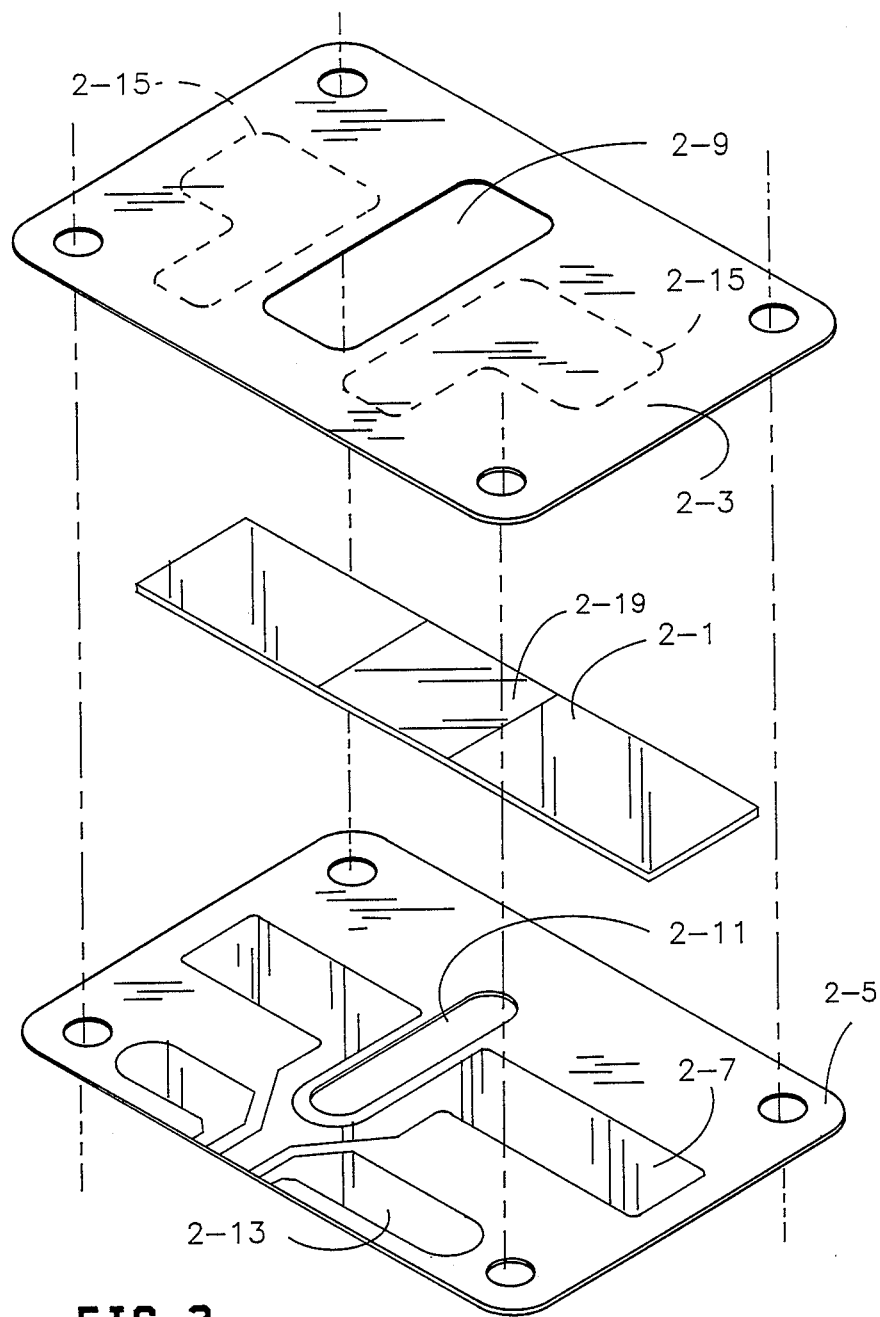
FIG. 2 shows an exploded view of the preferred embodiment of the membrane drop detector.

FIG. 1 shows the preferred embodiment of the piezoelectric membrane drop detector. The piezoelectric membrane 1-1 in the preferred embodiment of the invention is a piezoelectric polymer known as polyvinylidene fluoride (PVDF) that is about 9 microns thick. The polyvinylidene fluoride layer is metallized on either side with a layer of nickel and a layer of silver so that electrical connections can be made to the membrane. The nickel and silver layers are approximately 400 angstroms thick and are applied using a thin film deposition process such as evaporation, sputtering or chemical vapor deposition or other means, such as screen printing of conducting inks. Other metallization layers could be applied using similar processes. The metallized piezoelectric membrane is exemplified by one manufactured by Pennwalt Corporation located at 900 First Ave., King of Prussia, PA. Although the preferred embodiment of the invention uses polyvinylidene fluoride for the piezoelectric polymer, other materials may be substituted for it. Also, the piezoelectric polymer layer and the metal layers may have different thicknesses; but thin piezoelectric and metal layers are preferred, because the drops can deflect thin layers more readily than thick layers.

In the preferred embodiment, the piezoelectric membrane 1-1 is sandwiched between a cover plate 1-3 and a substrate 1-5. The cover plate 1-3 and the substrate 1-5 are preferably 0.005-inch thick Mylar selectively coated with a silver ink conductor 2-7. This silver ink conductor 2-7 conducts the electrical signals produced by the piezoelectric membrane 2-1 towards a printer controller (not shown). The piezoelectric membrane 2-1 is attached to the cover plate 2-3 and the substrate 2-5 with a pressure-sensitive adhesive that conducts electric signals, such as, the z-adhesive made by the Sheldahl Company of Northfield, Minn. In alternate embodiments of the invention, the substrate could be made from materials other than Mylar and could have thicknesses other than 0.005 inch. Also, a conductor other than silver ink and an adhesive other than the z-adhesive could be used.

As mentioned earlier, the primary feature and advantage of this membrane drop detector is that it vibrates at a selected resonant frequency when a drop impacts the membrane. The resonant frequency of the drop detector depends on many parameters, including: the material the membrane is made from, the thickness of the membrane, the material that coats the membrane, the thickness of the material that coats the membrane, and the mounting of the membrane to the substrate. FIG. 1 shows the preferred mounting of the membrane 1-1. The piezoelectric membrane 1-1 is mounted across a slot 1-11. The membrane 1-1 located on top of the substrate 1-5 is glued to the substrate 1-5 as described in the previous paragraph. Since the length of the membrane in the slot 1-19 is less than the length of the slot 1-21, the short ends of the membrane 1-17 are not anchored to the substrate 1-5. This configuration allows the membrane 1-1 to vibrate at a selected resonant frequency when struck by a drop.

In addition to the previously mentioned parameters, the resonant frequency depends on the length and the width of the membrane 1-1 inside the slot 1-11. In the preferred embodiment of the invention, the width 1-23 of the membrane inside the slot 1-11 is 0.08 inch and the length 1-19 of the membrane in the slot 1-11 is 0.3 inch. In the illustrated embodiment, the resulting membrane drop detector has a resonant frequency of 10 KHz. Alternate embodiments of the membrane drop detector, which may have a different resonant frequency, are formed by changing the dimensions of the membrane 1-1 inside the substrate slot 1-11 or by altering the membrane material or the coating on the membrane 1-1 or the tension of the membrane. The output signal of the drop detector may be filtered with a bandpass filter to improve the signal-to-noise ratio of the output signal.

The preferred embodiment of the membrane drop detector has a space behind slot 1-11 that allows the membrane 1-1 to vibrate freely. When the membrane drop detector is used in high frequency applications where drops strike the membrane 1-1 in rapid succession, damping materials can be placed behind the membrane 1-1 to allow the membrane 1-1 to recover quickly from a drop.

If drops accumulate on the piezoelectric membrane 1-1, the resonant frequency of the piezoelectric membrane 1-1 will change. Therefore, the preferred embodiment of the invention has a wiping mechanism that removes drops from the piezoelectric membrane 1-1. In the preferred embodiment of the invention, the slot 2-9 in the cover plate is larger than the slot 2-11 in the substrate. FIG. 1 shows this feature more clearly. The substrate 1-5 supports the piezoelectric membrane 1-1 during the wiping process. The larger slot 1-9 of the cover plate exposes the piezoelectric membrane 1-1 to facilitate the wiping. The wiping mechanism 4-2 is a roller that moves across the piezoelectric membrane 4-1 exposed by the cover slot 4-9 and pushes drops off the membrane 4-1 through holes 4-13 at the ends of the slot. To protect the piezoelectric membrane 1-1 and to reduce its surface friction, the membrane may be coated with a protective, non-wettable substance 2-19 such as polytetrafluorethylene, known as Teflon. Alternate embodiments may remove drops by shaking off the drops by driving the piezoelectric membrane at a selected resonant frequency with a high voltage signal. Other exemplary embodiments may remove drops by (i) blowing the fluid off the polytetrafluorethylene surface, (ii) using long wicking fibers to wick fluid from the surface, (iii) taking advantage of gravitational force, (iv) generating centrifugal force to act against drops, (v) vaporizing drops or, (vi) using various combinations of the preceding embodiments.

Ink jet printers may use drop detectors according to the preferred embodiment of the present invention to improve the quality of the printed image by extracting information from the ejected drop and using this information to adjust the operating parameters of the printhead. Also, drop detectors can be used to test the performance of drop generators in an ink jet printer and to automate the operation of the printhead as well as improve the print quality.

In the preferred embodiment of the invention, the cover plate 2-3 and its silver ink conductor shield the drop detector from electromagnetic fields. The piezoelectric membrane 2-1 connects a pattern 2-15 on the cover plate 2-3 to a pattern 2-13 on the bottom substrate 2-5 as a return to shield the signal from electromagnetic interference.

Figure 3:
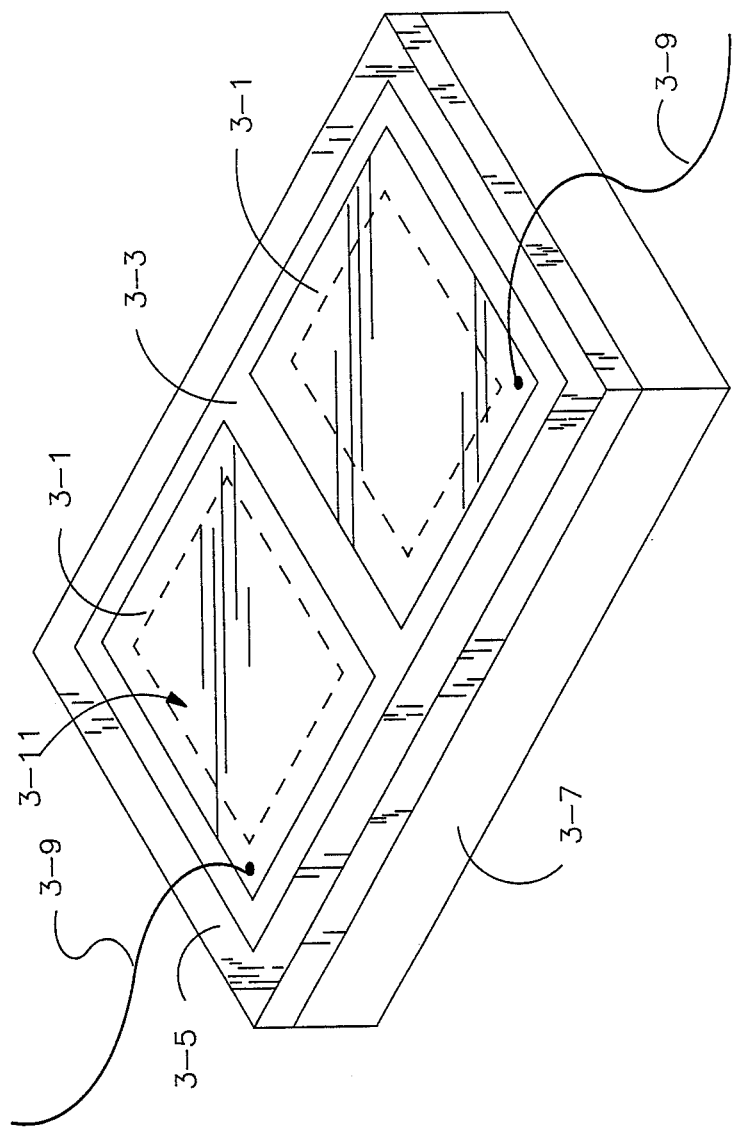
FIG. 3 shows an alternate embodiment of the membrane drop detector that uses two piezoelectric membranes connected in reverse polarity and uses a noise absorbing substrate.
Figure 4:
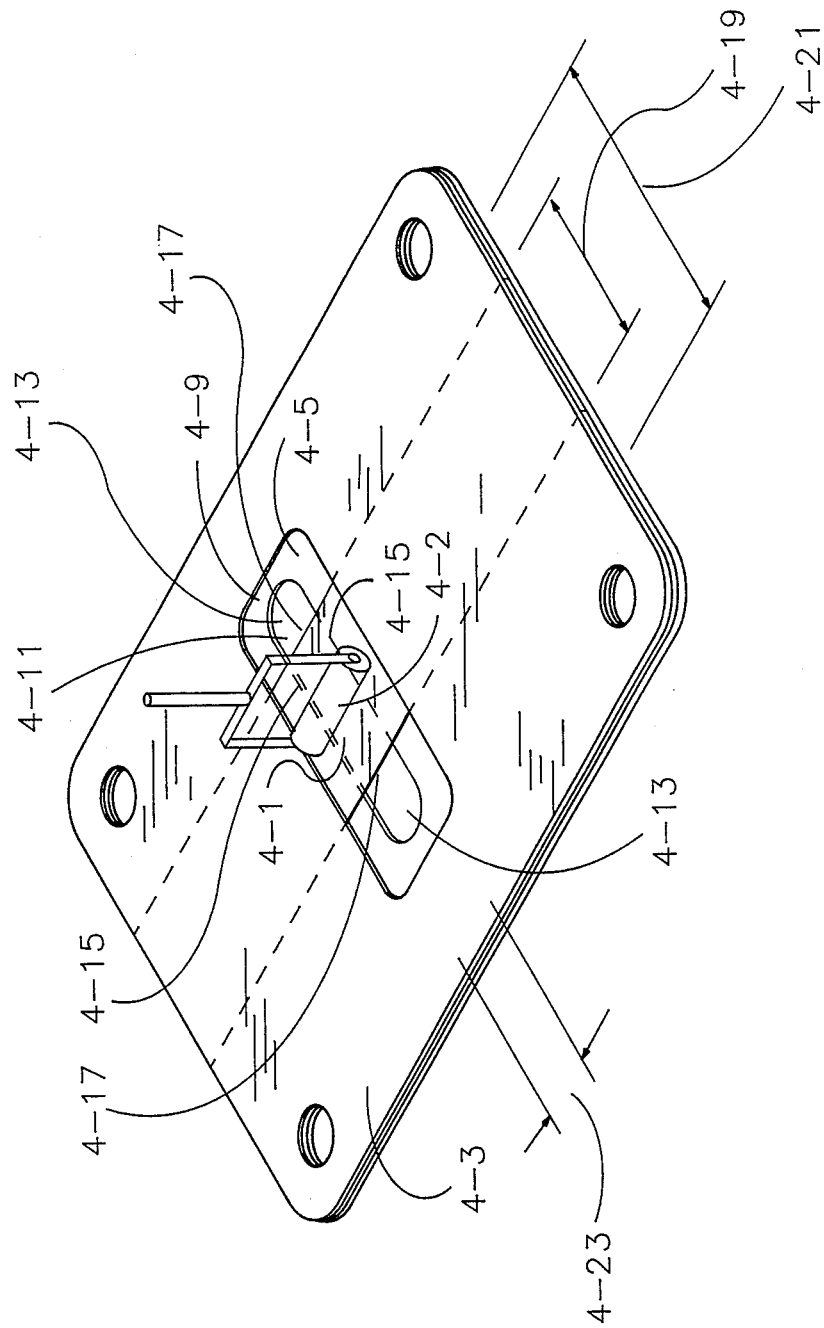
FIG. 4 shows the preferred embodiment of the wiping mechanism.
Figure 5A:
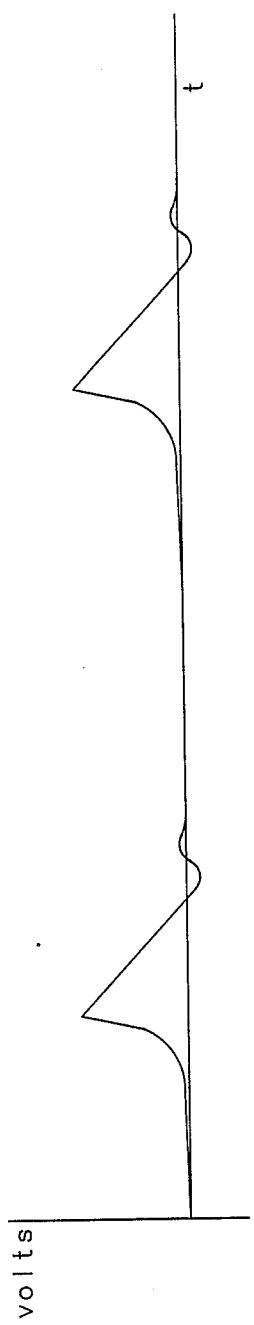
FIG. 5A shows the output signal produced by prior-art drop detectors.
Figure 5B:
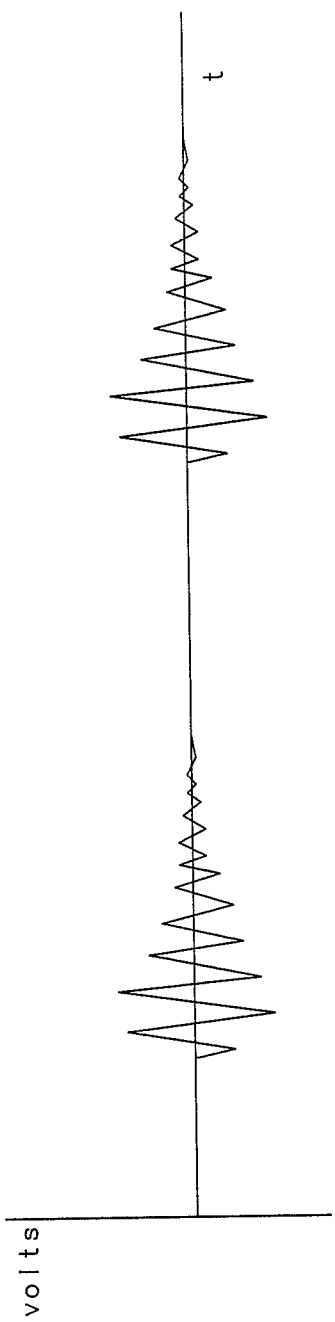
FIG. 5b shows the output signal produced by a drop detector according to the present invention.

FIG. 3 shows an alternate embodiment of the drop detector. This embodiment has two piezoelectric membranes 3-1. The membranes 3-1 are attached to the same conductive layer 3-3 that is mounted to the substrate 3-5. The substrate 3-5 has a void 3-11 behind each membrane so the membrane 3-1 can vibrate freely. The membrane output connections 3-9 are connected to provide common-mode rejection and improve the signal-to-noise ratio of the drop detector output. Additionally, this embodiment may be mounted on a noise absorbing substrate 3-7 to improve the signal-to-noise ratio of the output.

We claim:

1. A detector for detecting a drop of ink of the type typically present in an ink jet printer, the detector comprising:
  a. a cover plate, defining through itself a first slot having a first long dimension;
  b. a substrate, defining through itself a second slot having a second long dimension disposed to be aligned generally parallel with the first long dimension;
  c. a membrane:
    i. fabricated from a piezoelectric material which generates an electric signal in response to being impacted by a drop;
    ii. frequency tunable to a range of selected resonant frequencies;
    iii. secured at least at two locations between the cover plate and the substrate;
    iv. formed with a floating region:
      (1) having a generally rectangular area defined by:
        (a) a pair of short ends, opposite one another, defining the shorter width dimensions of the floating region, and
        (b) a pair of membrane lengths, opposite one another, defining the longer length dimensions of the floating region;
      (2) suspended across and between the slots with the pair of short ends being unsecured and therefore free to move;
      (3) aligned with the membrane lengths generally parallel with the long dimensions of the slots;
      (4) positioned to be impacted by and thereby detect the drop; and
  d. a conductor means, electrically coupled to the membrane, for transmitting to an external environment the electric signal generated by the membrane.

2. The detector defined in claim 1, wherein:
  a. the cover plate is fabricated from a Mylar material having a thickness of about 0.005 inch; and
  b. the substrate is fabricated from a Mylar material having a thickness of about 0.005 inch.

3. The detector defined in claim 1, wherein:
  a. the membrane is fabricated from a piezoelectric polymer of the type known as polyvinylidene fluoride (PVDF);
  b. the membrane has a thickness of about nine (9) microns; and
  c. a metallization layer:
    i. deposited on each side of the PVDF;
    ii. formed for detecting and conducting the electric signal resulting from the impact of a drop with the membrane.

4. The detector defined in claim 3, wherein: the membrane is formed to have a specific desired resonant frequency of 10 KHz by providing membrane dimensions, for that portion of the membrane overlying the second slot, of an 0.08 inch width and an 0.30 inch length.

5. The detector defined in claim 1, further comprising: a cleaning means for removing a buildup if any of the drops accumulated on the floating region of the membrane, the cleaning means comprising:
  a. creation of a first port and a second port respectively:
    i. positioned on each side of the floating region of the membrane;
    ii. formed by sizing the floating region to have a membrane length within the slots that is smaller than the long dimensions of the slots;
    iii. the first port and the second port thus cooperating with the first slot and the second slot to provide a pair of complete penetrations passing through the cover plate, past the membrane floating region, and through the second slot; and
  b. a wiping means for periodically engaging and scraping the accumulated drops if any along the surface of the membrane, and toward and out through at least one of the first port and the second port.

6. The detector defined in claim 5, further including: a non-sticking layer,
  a. applied to the floating region of the membrane,
  b. formed to retard the ability of the drops to stick to the floating region, thereby helping to keep the floating region clear of accumulated drops.

7. The detector defined in claim 1, further including: an electromagnetic shield, formed for protecting the membrane from electromagnetic fields if any, the shield comprising:
  a. an electrically conductive first pattern, formed on the bottom surface of the cover plate; and
  b. an electrically conductive second pattern,
    i. formed on the top surface of the substrate,
    ii. formed to electrically communicate with the first pattern when the cover plate and the substrate are placed adjacent each other to house the membrane.

8. The detector defined in claim 1, wherein: the detector is capable of detecting very small drops having a weight measurable in approximately the hundreds of nanograms range and having a velocity measurable in the 1-to-100 meters/second range.

9. The detector defined in claim 1, wherein the drop comprises: a particle of ink of the type typically found in an ink jet printer.

10. The detector define in claim 1, wherein any of the first slot and the second slot comprise: a slot formed in the shape of one of an ellipse and a circle.

11. The detector defined in claim 5, wherein the slots further comprise:
   a. a first slot:
      i. formed in the cover plate to have a first short dimension larger than a second short dimension of the second slot in the substrate;
      ii. sized and formed with respect to the wiping means to guide the wiping means as it moves across the floating region of the membrane so the floating means is not distorted while being cleaned of accumulated drops if any; and
   b. formed so the long dimension of the floating region of the membrane is supported by the upper surface of the substrate adjacent to the second slot when the wiping means moves across to clean the floating region of the membrane visible through the first slot.

12. A drop detector, comprising:
   a. a cover plate, defining through itself an oblong first slot;
   b. a substrate, defining through itself an oblong second slot sized to be smaller than the oblong first slot:
   c. a membrane:
      i. fabricated from a piezoelectric material which generates an electric signal in response to being impacted by a drop;
      ii. frequency tunable to a range of selected resonant frequencies;
      iii. secured at least at two locations between the cover plate and the substrate;
      iv. formed with a floating region:
         (1) having a generally rectangular area defined by:
            (a) a pair of short ends, opposite one another, defining the shorter width dimensions of the floating region; and
            (b) a pair of membrane lengths, opposite one another, defining the longer length dimensions of the floating region;
         (2) suspended across and between the slots with the pair of short ends being unsecured and therefore free to move;
         (3) aligned with the membrane lengths generally parallel with the long dimensions of the slots;
         (4) positioned to be impacted by and thereby detect the drop;
   d. a conductor means:
      i. electrically coupled to the membrane;
      ii. formed for transmitting to an external environment the electric signal generated by the membrane;
   e. a wiper:
      i. movably disposed in the vicinity of the floating region of the membrane;
      ii. formed for periodically being moved across the surface of the membrane to push the accumulated drops if any toward and through the first port and the second port; and
   f. an electromagnetic shield:
      i. coupled to the detector;
      ii. operable to attenuate an electromagnetic field if any that might otherwise degrade the performance of the membrane when detecting the drops.

* * * * *

UNITED STATES PATENT AND TRADEMARK OFFICE
CERTIFICATE OF CORRECTION

PATENT NO. : 4,835,435

DATED : May 30, 1989

INVENTOR(S) : King Wah W. Yeung

It is certified that error appears in the above-identified patent and that said Letters Patent is hereby corrected as shown below:

Page 1, field [75], Inventor's name "king W.W.Yeung" should read --King Wah W. Yeung--.

Signed and Sealed this

Nineteenth Day of June, 1990

Attest:

HARRY F. MANBECK, JR.

*Attesting Officer*       Commissioner of Patents and Trademarks